United States Patent [19]

Terajima et al.

[11] Patent Number: 4,651,168

[45] Date of Patent: Mar. 17, 1987

[54] THERMAL PRINT HEAD

[75] Inventors: Makoto Terajima; Kenji Fujino, both of Tokyo, Japan

[73] Assignee: Yokogawa Hokushin Electric Corporation, Tokyo, Japan

[21] Appl. No.: 781,252

[22] Filed: Sep. 27, 1985

[30] Foreign Application Priority Data

| | | | |
|---|---|---|---|
| Oct. 11, 1984 | [JP] | Japan | 59-213116 |
| Mar. 15, 1985 | [JP] | Japan | 60-51928 |
| Mar. 29, 1985 | [JP] | Japan | 60-65969 |

[51] Int. Cl.⁴ .............................................. G01D 15/10

[52] U.S. Cl. ................................ 346/76 PH; 219/216

[58] Field of Search .................... 346/76 PH; 219/216

[56] References Cited

U.S. PATENT DOCUMENTS

| | | | |
|---|---|---|---|
| 4,399,444 | 8/1983 | Moriguchi et al. | 346/76 PH |
| 4,534,814 | 8/1985 | Volpe et al. | 156/300 X |

*Primary Examiner*—E. A. Goldberg
*Assistant Examiner*—Gerald E. Preston
*Attorney, Agent, or Firm*—Moonray Kojima

[57] ABSTRACT

A thermal head comprising a plurality of electrode layers laminated in succession on one side of a substrate with a glass layer therebetween which serves as an electrical insulating and heat resistant layer, and a heating resistive element formed on the end surface formed by cutting an end portion of the substrate having the various layers thereon. The end surface may be subjected to skewed grinding. A method of manufacturing the thermal head is also disclosed. The thermal head is used in various types of printing machines and recorders.

2 Claims, 23 Drawing Figures

THERMAL PRINT HEAD

BACKGROUND OF THE INVENTION

1. Field of Invention

This invention relates to a thermal head comprising a heating resistive element formed in the direction of the end surface of a substrate thereof and usable in printing apparatus, and a method of manufacturing the same.

2. Description of the Prior Art

A conventional thermal head, such as shown in FIG. 1, generally comprises a substrate and a heating resistive element formed on the end portion of the substrate. In FIG. 1, the thermal head comprises a heating resistive element 2 formed on the end surface of a substrate 1 and electrode layers 3 and 4 laminated on opposite surfaces of the substrate with a part of each layer 3,4 overlapping the heating resistive element 2. This structure can provide a thermal head of high thermal efficiency, because the heating portion of the heating resistive element 2 comes into close contact with the recording paper or the like of a printer in which the thermal head may be used. Furthermore since the end portions of the substrate 1 can be shaped more evenly than the top or bottom portions, a plurality of heating resistive element 2 can be brought uniformily into contact with the recording paper or the like, with the result that high quality printing can be attained.

However, this conventional thermal head has the following disadvantages and deficiencies, which may be due to the electrode layers 3,4 being formed on both sides of substrate 1 in the manner depicted.

(1) It is impossible to form both electrode layers 3,4 on the respective sides of the substrate simultaneously. Thus, exact positioning of the electrode layers 3,4 in two steps, which is not simply, is necessitated.

(2) When a material such as ceramic (which is difficult to form a hole therein) is used for substrate 1, the wiring of, for example, lead wires must be conducted on another substrate, which makes it difficult to build a drive IC and other elements in the structure.

(3) Since the size of a printing dot (the length of the heating resistive element 2) is determined by the thickness of substrate 1, it is desirable to make substrate 1 as thin as possible for the purpose of improving the resolution of recording. On the other hand, if substrate 1 is too thin, the mechanical strength is weakened, which makes manufacturing of the head difficult.

(4) Since heating resistive element 2 is formed to envelop the end portion of substrate 1, there may be a break in the resistive element at the parts where the element folds around the edge portion of substrate 1.

Thus, the conventional thermal heads leave much to be desired.

SUMMARY OF THE INVENTION

Accordingly, an object of the invention is to overcome the aforementioned and other deficiencies and disadvantages of the prior art.

Other objects are to provide a thermal head which is suitable for enhancing resolution and which is easily manufactured; and to provide a method of manufacture the same.

BRIEF DESCRIPTION OF THE DRAWINGS

FIGS. 2 through 9 are explanatory views depicting steps in an illustrative embodiment of the invention, wherein FIGS. 2 and 3 depict the step of forming a selective electrode layer on a substrate.

FIG. 4 depicts the step of forming a glass layer on a selective electrode layer, which serves as an electrical insulation and heat resistant layer.

FIG. 5 depicts the step of forming a common electrode layer on the glass layer.

FIG. 6 depicts the step of printing and baking a glass layer on the surface of the substrate except for the lead portion in order to protect the selective electrode layer and the common element layer.

FIG. 7 depicts the step of cutting an end portion of the substrate to form an end surface on which a heating resistive element is deposited.

FIG. 8 depcits a sectional view of the end surface cut in the step of FIG. 7.

FIG. 9 depicts the step of cutting the heating resistive element into shapes corresponding to the selective electrodes.

FIGS. 10 through 12 depict the structural details of illustrative embodiments of the invention, wherein FIG. 10 depicts a multi-stylus head used for a line printer.

FIGS. 11 and 12 depict thermal heads having heating resistive elements arranged in two rows.

FIGS. 20 through 23 depict other illustrative embodiments of of thermal heads and methods of manufacturing same, wherein FIG. 20 depicts a thermal head having first and second selective electrode layers.

FIG. 21 is an operational explanatory view depicting the thermal head shown in FIG. 20.

FIG. 22 depicts the structure of the heating resistive element, which is deposited on the end surface and which is divided at a pitch P/2 for example by laser beam cutting.

FIG. 23 depicts the substrate of the thermal head of FIG. 20 being subject to skewed grinding.

DETAILED DESCRIPTION OF PREFERRED EMBODIMENTS

Figure 1:
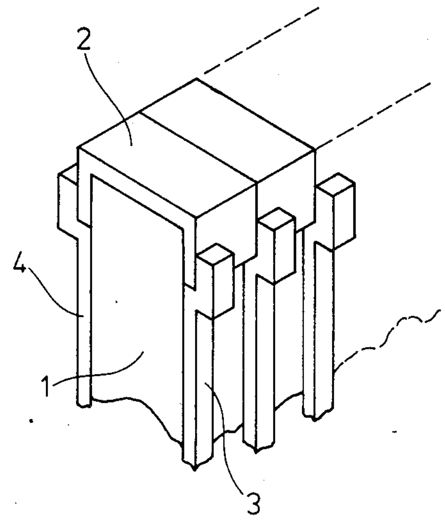
FIG. 1 PRIOR ART
FIG. 1 is a perspective view depicting a conventional thermal head.
Figure 2:
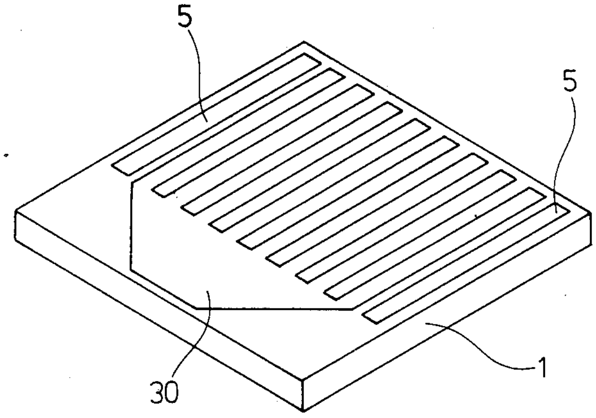
Figure 3:
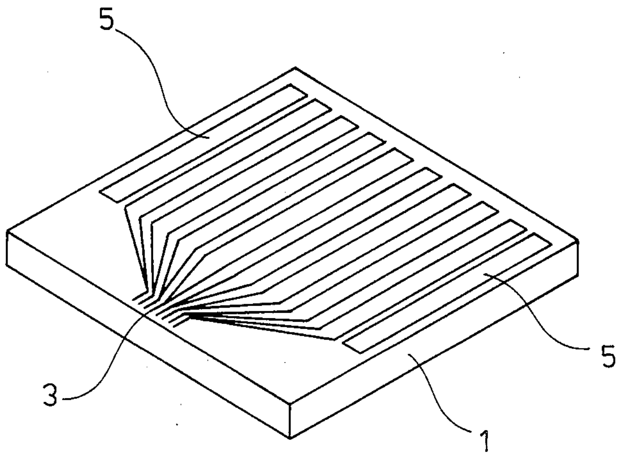

FIGS. 2,3 show the step of forming a first electrode layer on substrate 1. In these and the following figures, the same numerals shown in FIG. 1 will depict similar parts. A conductor (for example gold, silver palladium alloy, platinum, copper, or the like) is printed and baked or otherwise laminated onto substrate 1 (which may be, for example, a ceramic substrate) to form a conductive layer 30. As used herein the term "laminated" will be intended to be interchangeable with deposition, plating, printing, etching, and the like, and any other method of placing the layer on the substrate or other layer. Conductive layer 30, in FIG. 2, is thereafter etched into a pattern, as shown in FIG. 3, and constitutes a first electrode layer 3 (hereinafter referred to as "selective electrode layer") which incorporates selective electrodes to be connected to corresponding heating resistive elements which may be arranged in a row. Conductive layer 30 is etched into a minute pattern to obtain an electrode density of at least 10/mm. When the electrode density is comparatively low, it is possible to directly form an electrode pattern, such as shown in FIG. 3, by printing. Also formed on substrate 1 is electrode 5 used for taking return current from a common electrode, which will be discussed hereunder. The film thickness of the conductive layer 30 is generally about 3 to 5 μm.

Figure 4:
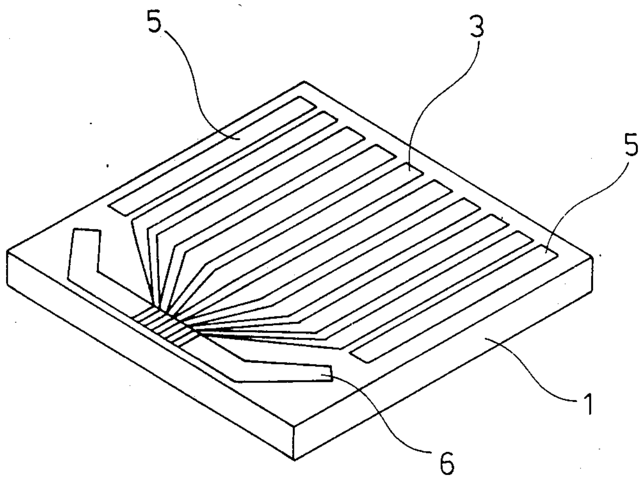

FIG. 4 shows the step of forming a glass layer 6 (which serves as an electrical insulation and thermal resistant layer) on top of selective electrodes layer 3, in the manner depicted. The glass layer 6 may be a high melting point glass or the like and may be printed and baked on selective electrode layer 3. The film thickness of glass layer 6 after baking is selected to be between 50 to 100 μm as described. The thickness of a glass layer after baking is generally between 20 to 30 μm, but repetition of printing and baking step can provide a desired film thickness, and can also control the film thickness.

Figure 5:
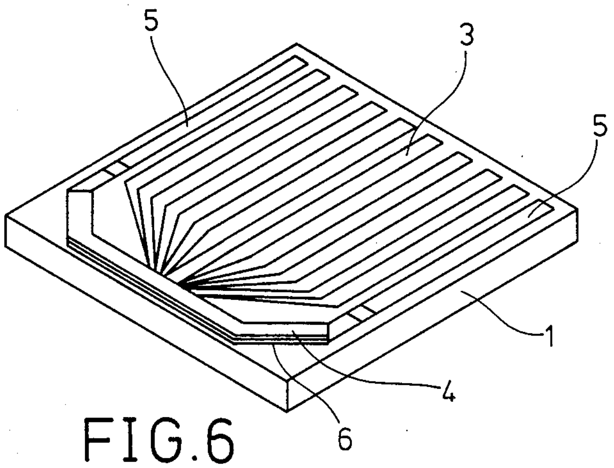

FIG. 5 shows the step of forming a second electrode layer 4 on top of glass layer 6 and also continuously to connect with conductive electrode 5, as depicted. The second electrode layer will be referred to as the "common electrode layer".

Figure 6:
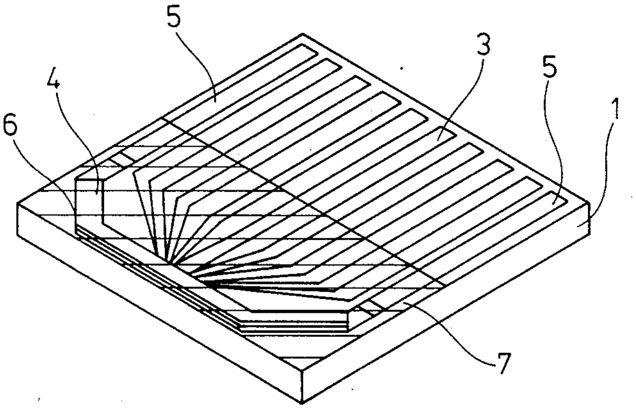

FIG. 6 shows the step of printing and baking a protective glass layer 7 on top of the surface of substrate 1 and other layers except for the lead portion (shown toward the right) in order to protect selective electrode layer 3 and common electrode layer 4. Glass layer 7 is, for example, of high melting point glass similar to that of glass layer 6. Protective glass layer 7 prevents electrode layers 3 and 4 from peeling off when the end portion (shown to left) of substrate 1 is cut away in the following step. Addition to the glass of powder of, for example, aluminum oxide ($Al_2O_3$), is effective for increasing wear resistance and thermal conductivity.

Figure 7:
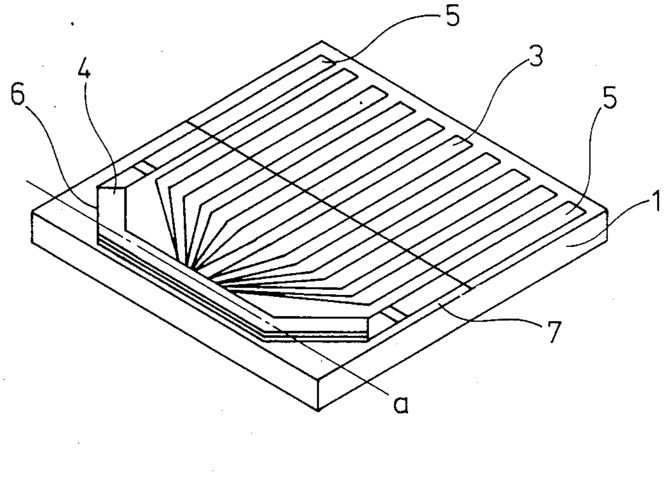
Figure 8:
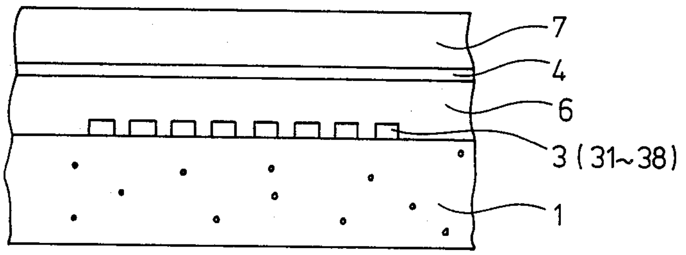

FIG. 7 shows the step of cutting away the end (leftward in the figure) portion of substrate 1 and other layers, to form the end surface on which heating resistive element 2 is deposited or otherwise laminated. Substrate 1, which is provided with successive conductive and glass layers, as shown in FIGS. 2–6, is cut away along line a in FIG. 7. FIG. 8 shows the end surface of the combined structure after the end portion is separated. As shown in FIG. 8, substrate 1, protective glass layer 7, selective electrode layer 3 (selective electrodes 31–38) and common electrode layer 4, are exposed and these electrode layers 3,4 face each other through glass layer 6 positioned therebetween. If the degree of roughness of the end surface after cutting is lower than the standard, the surface may be further polished to mirror finish.

Heating resistive element 2 is formed on the end surface prepared in the foregoing manner, for example, by sputtering or evaporation of a resistive material, such as tantalum nitride ($Ta_2N$) or nichrome (Ni-Cr) on the end surface. The film thickness of heating resistive element 2 in this case is determined in relation to the value of the resistance thereof, and is approximately 0.1 μm.

In the above described step, heating resistive element 2 is uniformily formed on the end surface with selective electrode layer 3 and common electrode layer 4 which are exposed, and conducts to these electrodes, for example by element 2 being connected to electrodes 3,4. It is then necessary to divide heating resistive element 2 corresponding to each selective electrode 31–38.

Figure 9:
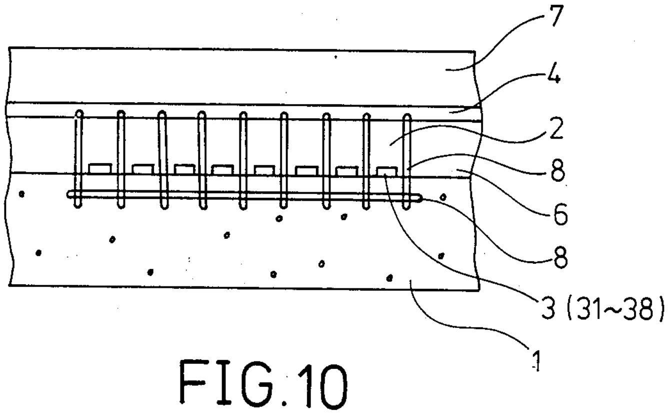

FIG. 9 shows heating resistive element 2 divided into shapes corresponding to the respective electrodes 31–38. Element 2 in this embodiment is divided, for example, by laser beam cutting, and reference number 8 denotes the trail of such laser beam cutting. The width of the laser beam cutting is determined by the spot size of the laser beam and the minimum width possible is about 30 μm. Thus, using a laser beam, it is easy to form heating resistive elements of high density.

As shown in FIG. 9, the length (see vertical dimension in FIG. 9) of heating resistive element 2 is determined by the thickness of glass layer 6 contained between electrodes 3,4. Hence, advantageously, it is possible to control the length of heating resistive element 2, as desired, by simply controlling the film thickness of glass layer 6.

After heating resistive element 2 is divided in the foregoing manner, an insulation layer, for example, of silicon oxide ($SiO_2$) tantalum pentaoxide ($Ta_2O_5$), boron nitride (BN), silicon carbide (SiC) or the like is sputtered or otherwise deposited on heating resistive element layer 2, as a protective and wear resistant layer. Alternatively, in consideration of thermal conductivity, a wear resistant metal layer may be deposited on heating resistive element 2 by dispersion plating, after insulation is provided on element 2, such as of silicon oxide or the like. As viewed in FIG. 9, the insulation and metal layers would be in a direction coming out of the drawing, and in FIG. 10, toward the left. In this case, nickel is mainly used for a metal film and thermal conductivity and wear resistance is enhanced by adding aluminum oxide, boron nitride, diamond or the like, as a dispersing agent.

Advantageously, the inventive thermal head comprises a plurality of electrode layers 3,4 laminated on one side of a substrate 1 with glass layer 6 positioned therebetween. This illustrative structure, advantageously, facilitates manufacture and wiring of the thermal head, and furthermore, enables desired simplified control of the length of the heating resistive element 2 by the simple expedient of controlling the film thickness of glass layer 6. That is to say, advantageously, high resolution is attained irrespective of the thickness of the substrate. Furthermore, since heating resistive element 2 is formed on the front end surface with electrodes 3,4 exposed thereat, the only portion of the substrate with which the heating resistive element must be brought into contact, is the end surface. In other words, it is not necessary to fold the heating resistive element, as is done in the prior art, and hence reliability is greatly improved. In addition, in the step of sputtering heating resistive element 2 on the end surface, substrate 1 is placed with the end surface facing the sputtering target. Thus, a plurality of substrates having various layers thereon, may be accommodated in the sputtering apparatus. Thus, mass production of the thermal heads is now possible.

In printing with the illustrative thermal head, advantageously the contact area thereof in relation to the recording paper, is smaller than that required in the prior art. Accordingly, in terms of the force with which the thermal head presses against the surface of the recording paper, advantageously, using the invention the same area covered is uniformily with a smaller pressing force per unit area than obtained with a conventional head. Thus, with the invention, printing quality is considerably improved and the structure of the pressing mechanism is simplified.

In the foregoing embodiment, first electrode layer 3 is deposited directly onto the surface of substrate 1. But, advantageously, in another embodiment, not shown, depending on the degree of roughness of the surface of substrate 1, a glass layer may be provided between substrate 1 and electrode layer 3 to provide a smooth foundation for electrode layer 3. Although heating resistive element 2 is divided by laser beam cutting in the foregoing embodiment, other methods may be used for such cutting, such as etching by photolithography, mechanical cutting with a blade, or sandblasting. The wear resistant layer to be formed on heat resistive element 2 is not limited to a sputtered thin film, but may be a glass layer. It is also possible to attach an aluminum plate or a ceramic plate to the electrode protective glass layer so as to maintain mechanical strength and to correct any warping of substrate 1.

Figure 10:
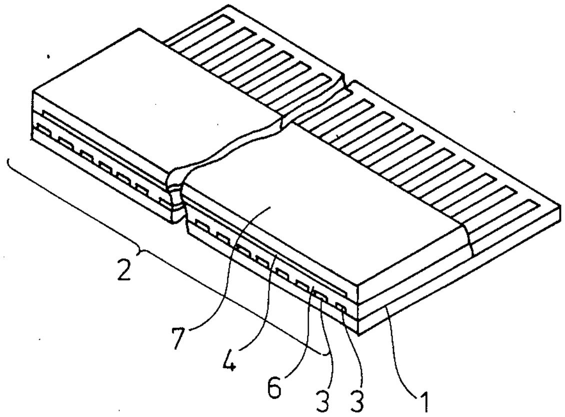
Figure 11:
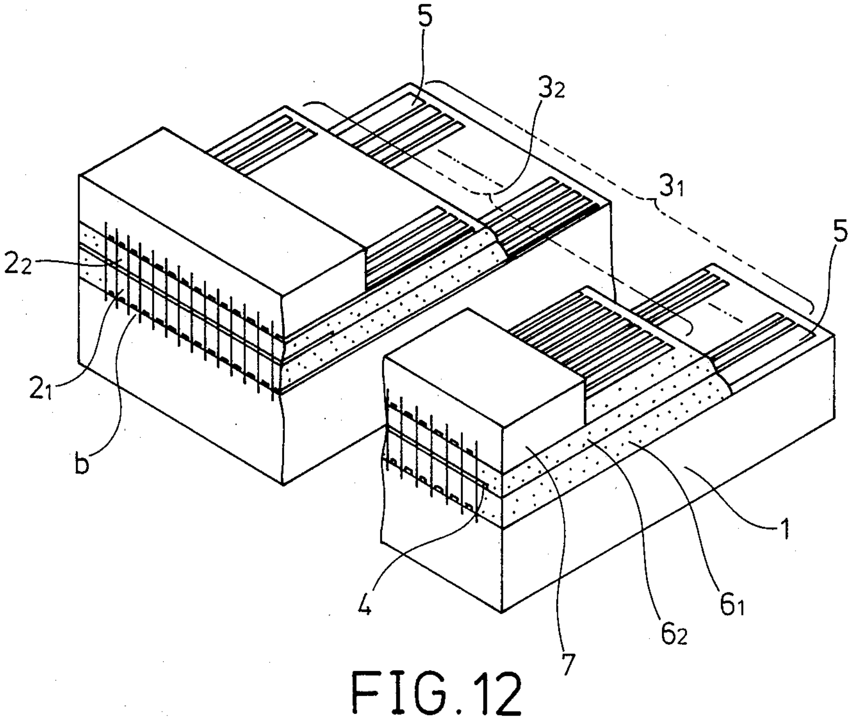
Figure 12:
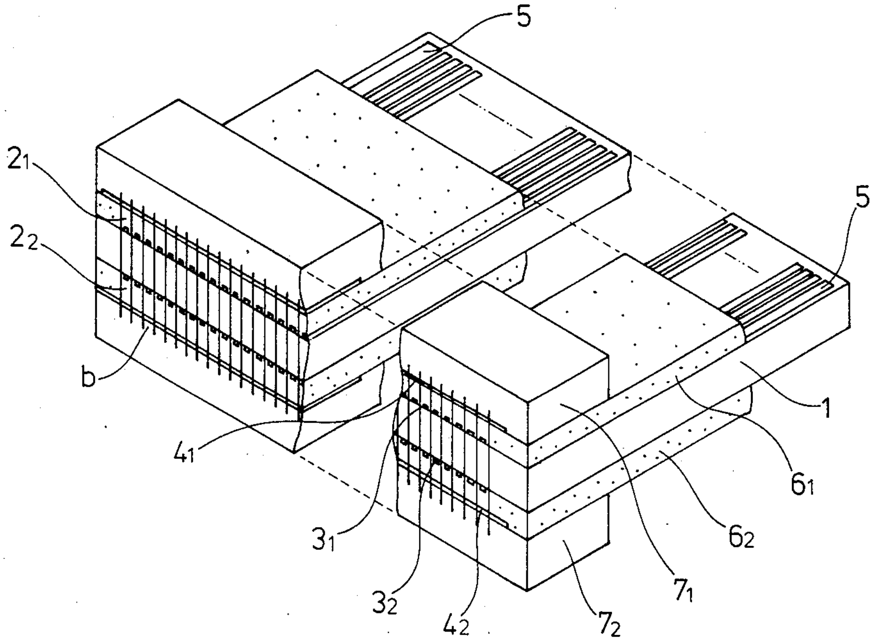

FIGS. 10 to 12 show other illustrative embodiments of the invention. In FIG. 10, heating resistive element 2 is formed as a multi-stylus head, such as that use for a line printer. A plurality of heating resistive elements 2 are arranged in a row, as depicted.

In FIG. 11, heating resistive elements 2 are arranged in two rows. A selective electrode layer $3_1$, a glass layer 6, common electrode layer 4, glass layer $6_2$, selective electrode layer $3_2$, and protective glass layer 7 are laminated onto substrate 1, in that order. Heating resistive element 2 is formed on the end surface of the cut substrate 1, as depicted. Element 2 is cut along the fine line b in FIG. 11 to provide a plurality of thermal heads arranged in two adjacent rows.

The thermal head shown in FIG. 12 comprises selective electrode layers $3_1$, $3_2$, common electrode layers $4_1$, $4_2$, glass layers $6_1$,$6_2$, and protective glass layers $7_1$, $7_2$, which are laminated in that order on either side of substrate 1, as depicted. By forming heating resistive elements 2 by a method similar to the step shown in FIG. 11, a plurality of heads are attained arranged in two rows and separated by a space corresponding to the thickness of substrate 1.

In the above embodiments of FIGS. 10,11,12, the end surface (shown to the left) on which heating resistive element 2 is deposited is formed by utilizing the end surface obtained by cutting the end portion of a substrate 1 which has electrode and other layers. However, a desired end surface can also be formed by grinding the end surface at an oblique angle. This skewed grinding is advantageous in comparison to grinding the entire end surface at right angles. For example, chipping of the edge portion, which may occur when the entire end surface is cut, is unlikely to occur, since it is sufficient to grind only enough to expose the electrode layers. For similar reasons, the area to be ground and the time required for grinding are reduced. Also, advantageously, a flat surface may be formed without any differences in level at the boundary portions. Moreover, advantageously, the length of the heating resistive element can be made greater than the thickness of the glass layer, so that it is possible to form a heating resistive element of a predetermined length even with a comparatively thin glass layer. Furthermore, advantageously, the areas of the electrodes which are exposed at the end surface and come into contact with the heating resistive element is larger, thus improving reliability.

An example of the manufacturing process using skewed grinding will now be described.

The steps of laminating electrodes and other layers on substrate 1 and of cutting the end portion thereof are the same as those shown in FIGS. 2–7 and described in connection therewith.

Figure 13:
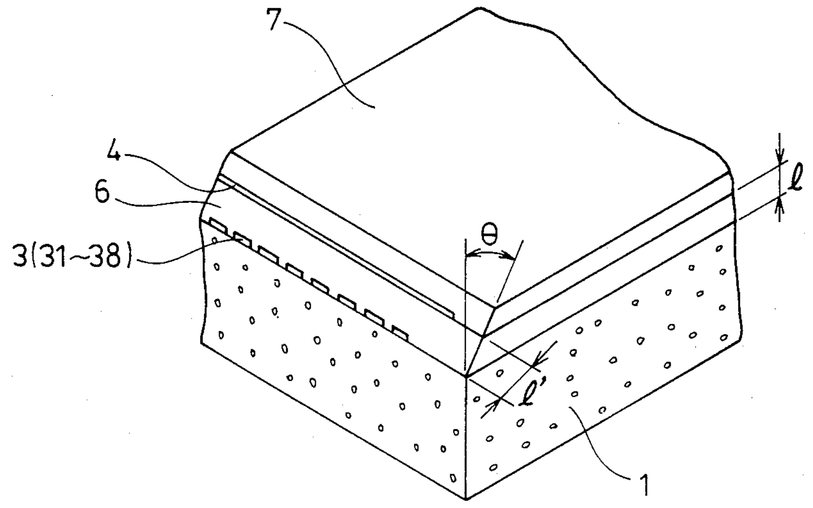
FIG. 13 depicts the structural details of another illustrative embodiment wherein an end surface, on which a heating resistive element is to be deposited, is formed by subjecting the end portion to skewed grinding.
Figure 14:
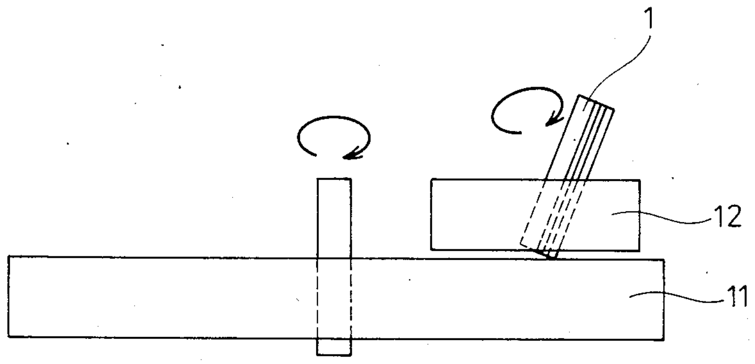
FIG. 14 depicts an apparatus for skewed grinding of the subtrate having the various layers thereon.
Figure 15:
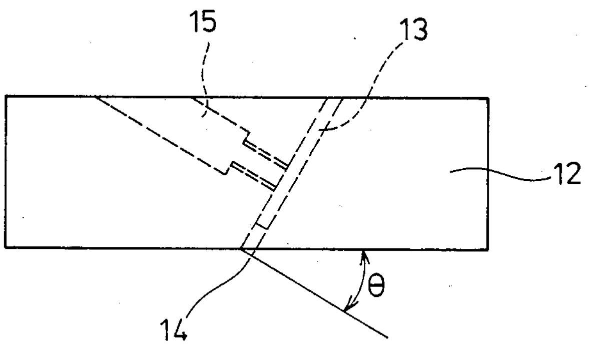
FIG. 15 depicts a substrate holder used with the apparatus of FIG. 14.
Figure 16:
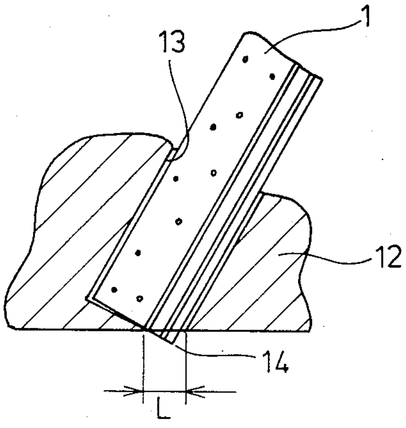
FIG. 16 depicts an enlarged view of the main part of the subtrate holder shown in FIG. 15.

FIGS. 13–16 show the step of grinding a part of the cut end surface of substrate 1 and having the other layers thereon at an oblique angle, to form the end surface on which resistive element 2 is deposited at the angular ground surface having exposed layers. Substrate 1 is attached to a substrate holder 12 at a predetermined angle in such a way that a portion thereof, which is to be ground on a rotatable grinding plate 11, protrudes therefrom. Skewed grinding is conducted, as shown in FIG. 14, by placing substrate holder 12 on a grinding plate 11 and by rotating substrate holder 12 about its own axis and about the axis of grinding plate 11. FIG. 15 shows an example of a substrate holder 12. FIG. 16 is an enlarged view of the main part of substrate holder 12 shown in FIG. 15.

Figure 17:
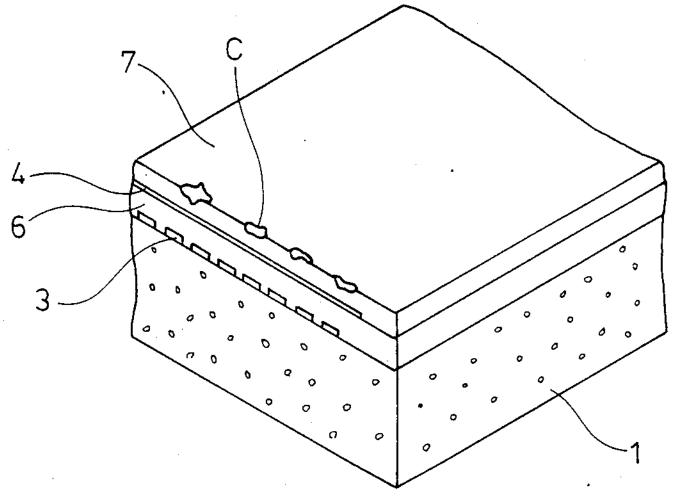
FIG. 17 depicts chipped parts of the structure, such as caused by cutting of the substrate having the various layers thereon.

A groove 13 is provided in holder 12 for receiving substrate 1 so that the end surface thereof is inclined at a predetermined angle $\theta$ with respect to grinding plate 11. A slit groove 14 of a predetermined width L (e.g. 0.1 to 0.3 mm) is provided at the end portion of the bottom surface of the groove 13 so that the portion of substrate 1 to be ground protrudes therefrom. A threaded hole 15 is provided in holder 12 for fixing and holding substrate 1. Grinding is finished when the portion of substrate 1 to be ground has been ground to the same level as the bottom surface of substrate holder 12, by means of this apparatus. At this point, the area to be ground becomes larger. This grinding step, advantageously can remove chipped parts (which may exist at the edge portion of the end surface of substrate 1, such as shown in FIG. 17. These chips C may be produced depending on the grinding roughness of the dicing blade used to cut the end portion of substrate 1 and layers thereon.

Element 2 is formed on the end surface, at the part which is ground obliquely, by sputtering or evaporation thereon of a resistive material, such as tantalum nitride ($Ta_2N$), nichrome (Ni-Cr) or the like, in the same manner as in the previous describe parts.

Figure 18:
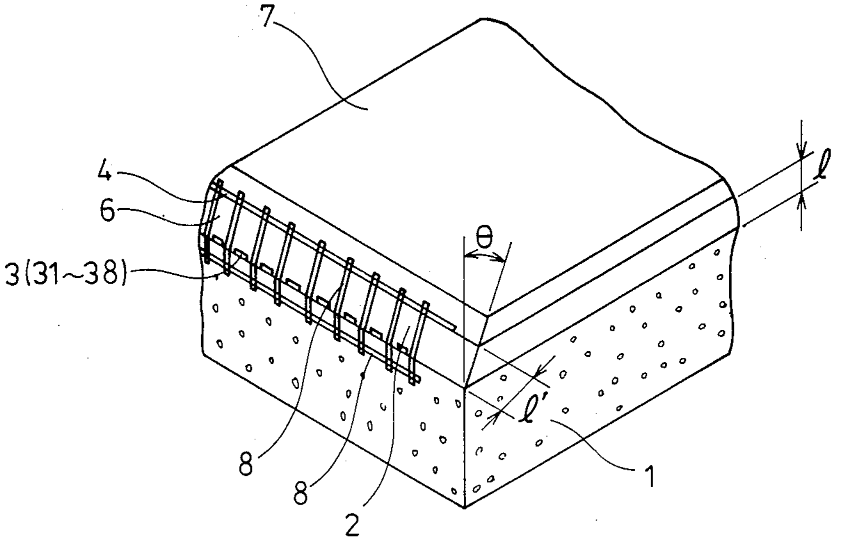
FIG. 18 depicts the structure of a heating resistive element, which is deposited on the end surface of the thermal head shown in FIG. 13, after skewed grinding, and which is divided thereafter.

Element 2 is divided up by laser beam cutting, as shown in FIG. 18. An insulation layer of silicon dioxide ($SiO_2$), tantalum pentaoxide ($Ta_2O_5$), boron nitride (BN), silicon carbide (SiC) or the like, may be further sputtered onto heating resistive element layer 2, as a protective and wear resistant layer.

Length l' of heating resistive element 2 is, as shown in FIGS. 13 and 18, determined by thickness l of glass layer 6, which is between selective electrode layer 3 and common electrode layer 4, and angle $\theta$ of the skewed grinding ($l'=l/\cos\theta$) . Advantageously the length of element 2 can be freely controlled by controlling film thickness l and angle $\theta$ of the skewed grinding.

Skewed grinding is not limited to this embodiment, and for example, wrapping tape may be used in place of the grinding plate.

Figure 19:
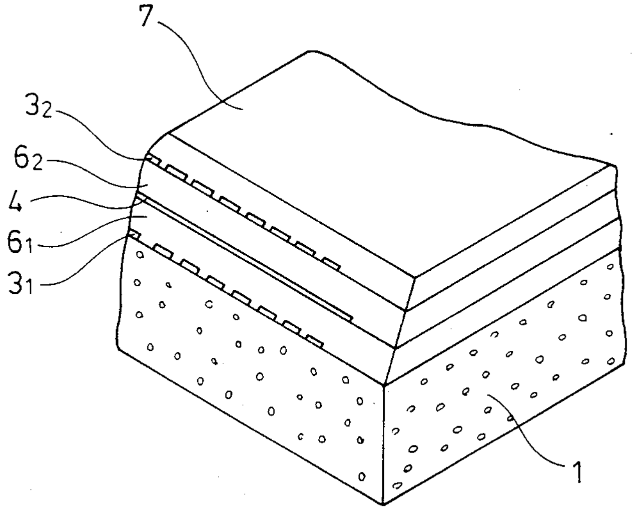
FIG. 19 depicts the structure of a substrate, which is subjected to skewed grinding, for forming heating resistive elements in two rows, as shown in FIG. 11.

Another illustrative embodiment is shown in FIG. 19, wherein the end surface on which element 2, which are arranged in two rows in the same manner as in the head shown in FIG. 11, are deposited, is formed by skewed grinding. In the same manner as shown in FIG. 11, selective electrode layer $3_1$, glass layer $6_1$, common electrode layer 4, glass layer $6_2$, selective electrode layer $3_2$, and protective glass layer 7 are laminated onto substrate 1 in that order. Thereafter, the end surface is ground at an oblique angle, so that a plurality of electrode layers are exposed. Then, heating resistive elements 2 are formed on the grounded part of the end surface and are divided up such as by use of a laser beam along the selective electrodes.

Thermal heads are used, for example, in line printers, such as in facsimile machines, and, in most cases, such a line printer requires a thermal head which has a higher resolution than a serial type of printer using thermal head.

FIGS. 20–23 depicte other illustrative embodiments of the invention, wherein thermal head having higher resolutions are realized. In FIGS. 20–23, the thermal head comprises a substrate with electrode and other layers laminated thereon, and a heating resistive element deposited on the end surface of the substrate as in the previously described embodiments. Also, a second selective electrode layer is provided in place of the common electrode layer which is provided so as to face the selective electrode layer in the above embodiments. The first and second electrode layers are aligned at a deviation of ½ pitch with respect to the arrangement pitch of the electrodes.

Figure 20:
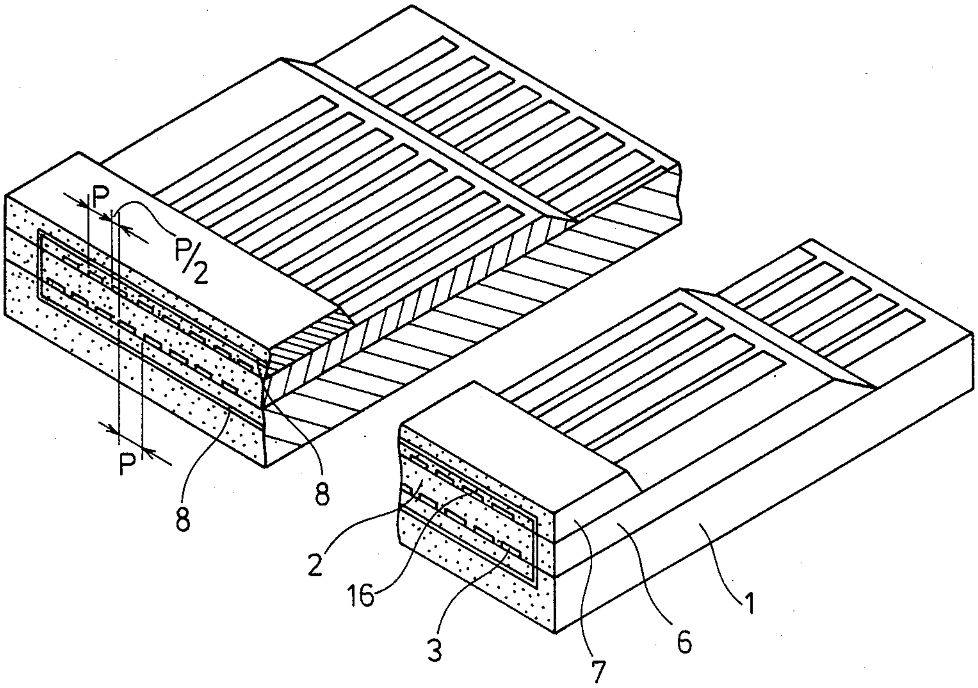

In FIG. 20, first selective electrode layer 3 is formed on top of the surface of substrate 1, and a second selective electrode layer 16 is formed on top of glass layer 16, which is formed on top of the first selective electrode layer 3, as depicted. Protective glass layer 7 is laid over second electrode layer 16. The end portion of substrate 1 (on which these layers are overlaid) is cut so that first and second selective electrodes layers 3, 16 are exposed. Then, heating resistive element 2 is deposited on the end surface. Heating resistive element 2 is then divided into strips in the vicinity of the first and second selective electrode layers 3,16 such as by use of a laser beam cutting (8). The pitch P, at which the electrodes of the first and second selective electrode layers 3,16, are arranged is the same. However, the electrodes in the two layers are offset by a ½ pitch (P/2) from each other in the manner depicted.

Figure 21:
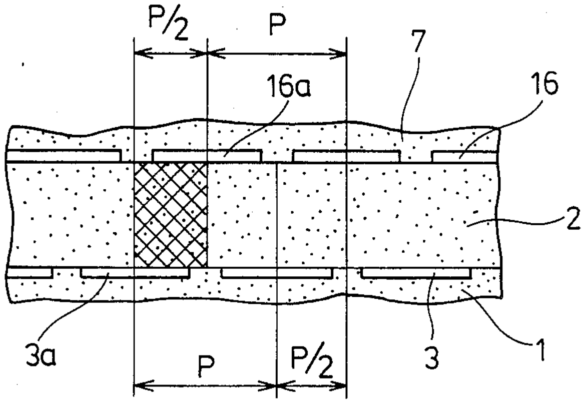

FIG. 21 illustrates operation of this thermal head of FIG. 20. As shown in FIG. 21, if electrodes 3*a* and 16*a* in the first and second selective electrode layers 3 and 16, which face each other at an offset of ½ pitch, are selectively driven, a current flows in the portion of element 2 which is defined between the electrodes 3*a* and 16*a*, to heat that portion. Since the first and second selective electrode layers 3, 16 are made to have an offset of ½ pitch, the recording width corresponding to one dot is about P/2, even though the arrangement pitch of the selective electrode layers 3,16 is P. Thus, a recording resolution of twice the actual arrangement pitch is obtained by the embodiment.

Figure 22:
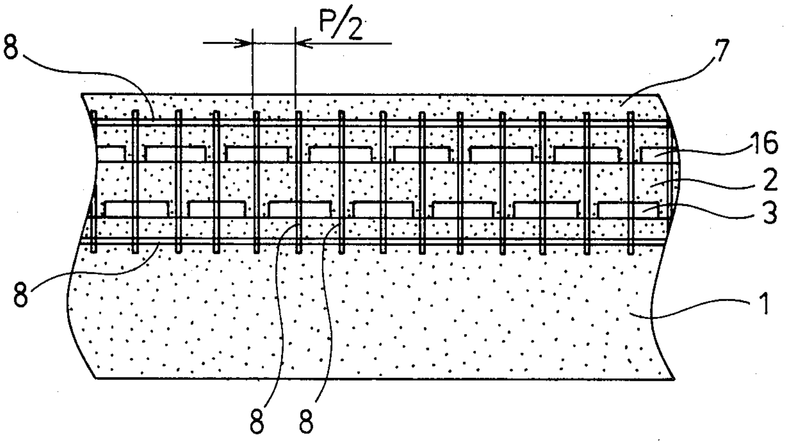

A drive current can sometimes erroneously flow to a selective electrode which is adjacent to the correct one. This may be prevented by insertion of a diode or the like in the drive circuit of the thermal head. However, advantageously, with this embodiment, suitable division of element 2 by laser beam cutting (8), as shown in FIG. 22, can completely cut off undesirable currents, thereby completely separating each recording dot and thus realizing a printout of high resolution and high quality.

Figure 23:
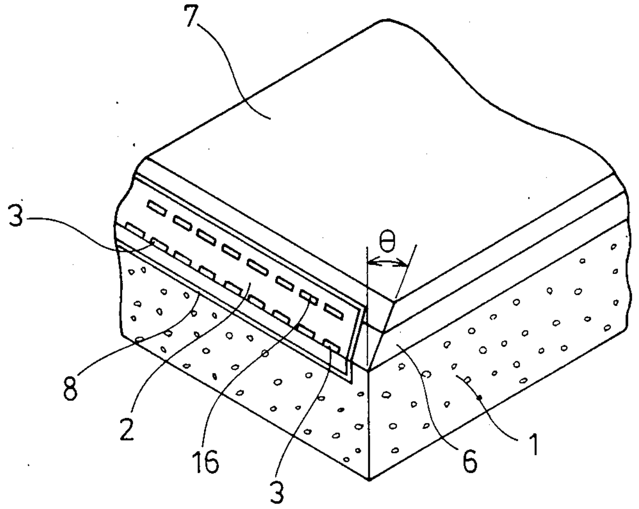

FIG. 23 shows another illustrative embodiment wherein the first and second selective electrode layers 3,16 shown in FIG. 20, and the end surface on which element 2 is deposited, is formed by skewed grinding.

As described above, a plurality of electrode layers are overlaid in succession on one side of substrate 1 so that they face each other on either side of a glass layer which serves as an electrical insulation layer and as a heat resistant layer. Then, all the layers and substrate, are cut in a straight line, and, if desired, the cut portion may be ground at an oblique angle. Then, a heating resistive element is formed on the cut end surface on the ground part thereof or at the cut end surface itself, at which the electrode layers are exposed. This inventive structure, advantageously, enables production of three layered, four layered, or cross over wiring devices, with a reduction in the number of parts and connection points, and further enables miniaturization of the thermal head provided with a driver. Thus, advantageously, the invention results in a reduction in cost and an increase in reliability. Moreover, advantageously, control of the length of the heating resistive element is simplified, which facilitates manufacture. Thus, this invention realizes a thermal head which is suitable for enhancing recording resolution and which is easily manufactured, and furthermore, realizes a method of manufacturing such thermal heads.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A thermal head comprising
 - a substrate (1) having a substantially flat planar surface and a substantially flat end surface substantially perpendicular to said planar surface;
 - a first metallic layer (3) laminated on said flat planar surface and divided to form a plurality of individual electrodes (31–38), each individual electrode being disposed close to said end surface, and being of substantially the same thickness;
 - a first insulating layer (6) laminated on top of said first metallic layer (3) toward said end surface of said substrate (1);
 - a second metallic layer (4) laminated on top of said first insulating layer (6) toward said end surface of said substrate (1) and connected to at least one of said individual electrodes of said first metallic layer (3);
 - a second insulating layer (7) laminated on top of said second metallic layer (4) toward said end surface of said substrate (1); and
 - a plurality of heating elements (2 of FIG. 9) disposed on said end surface of said substrate (1) corresponding to the number of said individual electrodes (31–38) excluding the electrodes connected to said second metallic layer, and connected respectively to said individual electrodes (31–38), and connected to said second metallic layer (4) and overlapping said first insulating layer (6).

2. The head of claim 1, (FIG. 13) wherein said first metallic layer (3), said first insulating layer (6), said second metallic layer (4) and said second insulating layer (7) are positioned so that the ends thereof extending toward said end surface of said substrate (1) are at an angle ($\theta$) to said end surface of said substrate (1).

* * * * *